United States Patent

[11] 3,615,755

| [72] | Inventors | Yashimitsu Uto;<br>Daizo Yamasaki; Teisiro Watanabe; Kouji Matsuoka, all of Hiroshima-shi, Japan |
|---|---|---|
| [21] | Appl. No. | 2,930 |
| [22] | Filed | Jan. 14, 1970 |
| [45] | Patented | Oct. 26, 1971 |
| [73] | Assignee | Mitsubishi Jukogyo Kabushiki Kaisha<br>Tokyo, Japan |
| [32] | Priority | Oct. 18, 1966 |
| [33] | | Japan |
| [31] | | 41/68493 |
| | | Continuation-in-part of application Ser. No. 673,306, Oct. 6, 1967, now abandoned. |

[54] METHOD FOR MAKING A MOLD USING MANGANESE CARBONATE
9 Claims, No Drawings

[52] U.S. Cl. .................................................. 106/38.3, 106/38.35, 106/38.9, 106/84
[51] Int. Cl. ...................................................... B28b 7/34
[50] Field of Search............................................ 106/38.3, 38.35, 74, 84, 38.2–38.9

[56] References Cited
UNITED STATES PATENTS

| 2,368,322 | 1/1945 | Passelecq ..................... | 106/38.35 |
| 2,883,723 | 4/1959 | Moore et al. .................. | 164/16 |
| 2,926,098 | 2/1960 | Ilenda et al. .................. | 260/77.5 |

Primary Examiner—Lorenzo B. Hayes
Attorney—McGlew and Toren

ABSTRACT: A method of making a mold or the like comprising the steps of mixing an alkali silicate as a binder with molding sand and adding manganese carbonate to the mixture of molding sand and alkali silicate as a self-hardener, and forming the mixture into a mold. Additionally, the mixture may be fluidized by adding a surface-active agent and also water may be added to assist in the fluidizing operation.

A composition of material for forming a mold is comprised of a mixture of molding sand, such as silica sand, olivine sand, zircon sand, and the like, an alkali silicate, such as sodium silicate, used as a binder, and powdered manganese carbonate is employed as a self-hardener. If a fluidized mixture is desired a surface-active agent, such as sodium salt of N-lauryl amino propionic acid and water may be added to the sand mixture.

METHOD FOR MAKING A MOLD USING MANGANESE CARBONATE

This application is a continuation-in-part of our copending application, Ser. No. 673,306, filed Oct. 6, 1967, now abandoned.

BACKGROUND OF THE INVENTION

The present invention relates to a method and a composition of material for making a core and a mold in which manganese carbonate is used as a self-hardener and alkali silicate is used as a binder.

In a typical method now in general use for making a core and a mold using alkali silicate as a binder, carbon dioxide gas is blown into the core and mold for hardening them. Furthermore, in the method, the ramming of a core box or of a mold is necessary. Although, in some cases, the ramming process has been mechanized, however, in most instances the ramming is performed with hand tools. Accordingly, too much labor is expended to the extent that it amounts to 30–50 percent of the total of the production steps.

In order to lessen the amount of hand labor to some degree, various kinds of self-hardening molding materials have recently been examined. These materials do not necessitate the blowing of carbon dioxide gas, but still a self-hardener has to be added. The added self-hardener reacts upon alkali silicate to produce the hardened substances. On the other hand, the hardening time is in relationship to the rate of the reaction, and in view of the substances thus produced and in view of the relationship of the hardening time to the rate of the reaction, methods that are adequate for practical operations are few.

For instance, one of the above-mentioned self-hardening molding materials produces, in hardening, an explosive gas due to the reaction of alkali silicate upon an added self-hardener. The gas thus obtained may remain within the core and the mold and induce an explosion during the pouring of molten metal. Furthermore, one of the hardening methods utilizing the hydration between an alkali silicate and an added self-hardener necessitates the addition of a large quantity of self-hardener for the purpose of promoting the rate of reaction and of increasing the final strength (of a core and a mold). Thereby, the refractoriness of the core and that of the mold are markedly reduced. Furthermore, because self-hardening molding materials necessitate ramming with handtools, an appreciable reduction in the number of man-hours of labor required cannot be expected.

Recently, a method for pouring fluidized mixed sand into a core box or into a mold has been disclosed. In this method, a surface-active agent (foam producing agent) is added to the mixed sand so that the amount of labor necessary for ramming the mixed sand in the core box or in the mold may be lessened. However, because the hydration between the alkali silicate and the added self-hardener is used for obtaining the self-hardening of the mixed sand, the refractoriness of the core and that of the mold become lower. Furthermore, the use of waste sand is very difficult because of the added self-hardener still remaining in the waste sand. Accordingly, though a reduction in the number of man-hours necessary for making the core and the mold becomes possible, the number of man-hours necessary for finishing the cast product after pouring is increased. Furthermore, the cost of molding materials becomes greater.

DESCRIPTION OF THE INVENTION

An object of the present invention is to overcome the disadvantages to which reference has been made.

Another object of the present invention is to provide a method for making a mold, in which the rate of reaction between an alkali silicate and an added self-hardener is practicable; the hardening time is appropriate; the strength after self-hardening of a core and that of a mold are sufficient; the danger of producing a gas due to the reaction is slight; and the refractoriness of the core and that of the mold are little reduced. Furthermore, of the whole casting process the number of molding steps is significantly reduced; and the use of waste sand becomes easier because of the small quantity of added self-hardener used.

Still another object of the present invention is to provide a method for making a mold, in which refractory particles of silica sand, olivine sand, zircon sand, etc. are used as molding sand and in which a carbonate such as manganese carbonate (about 0.5 to 5.0 percent by weight) is added to either mixed sand obtained by adding silicate (having a ratio of silica to an alkali metal oxide in the range from 1.8:1 to 2.5:1 and having a quantity of about 6 to 10 percent by weight) as a binder to the molding sand or fluidized sand obtained by adding a surface-active agent (foam producing agent of about 0.05 to 0.8 percent by weight) and water (about 0.5 to 4.0 percent by weight) to the mixed sand. Thereby, a natural hardening making use of the chemical reaction between the carbonate and the alkali silicate can be obtained.

There are two systems of surface-active agents adapted for use in the present invention: one of them is represented by a higher alcohol sulfonate ester such as coconut alcohol ester (sodium salt); the other is expressed by the following formula:

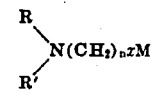

wherein R = aliphatic hydrocarbon of 6 to 20 carbon atoms; or aliphatic acid residue of 6 to 20 carbon atom; or

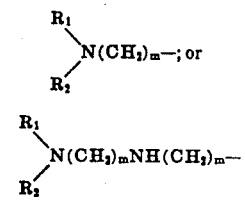

R′ = H, or hydrocarbon group of 1 to 6 carbon atoms, or

Furthermore, $R_1$ = hydrocarbon group of six to 20 carbon atoms,
$R_2$ = H, or hydrocarbon group of one to six carbon atoms
$x$ = carboxyl group, or sulfonate
$M$ = H, or alkali metals
$m = 1 - 6$
$n = 1 - 4$ The surface-active agents of this kind are: N-lauryl amino proprionic acid (sodium salt); N-lauryl amino butyric acid.

The mixed sand used in the method of the present invention is characterized by its self-hardening. This property is obtained as the result of the reaction of the added self-hardener upon the alkali silicate contained in the mixed sand. As alkali silicate, for instance, sodium silicate ($Na_2O \cdot nSiO_2 \cdot mH_2O$) having a molecular rate in the range of 1.8–2.5 is mostly used. The molecular rate is not limited to this range but varies according to atmospheric temperature. The molecular ($M.R.$) of sodium silicate is given by the following formula:

$$M.R. = _2/Na_2O \times 1.03$$

In general, if the rate of the reaction of the added self-hardener upon the alkali silicate is fast, then hardening begins even during mixing or during the molding of the core and also the mold, and therefore this is not practicable. On the other hand, if the hardening is slow, the operational efficiency becomes very low.

The inventors have investigated reactions of various chemical substances upon alkali silicate and found that manganese carbonate is excellent in the hardening time and in the strength of the mold.

It is indeed not clear what chemical reaction between the carbonate and the alkali silicate, as a binder, causes the hardening, but is presumed that when some additive, the dissolving rate of which is low, is brought into contact with the alkali silicate the slow dissolving of the additive causes its ionization, which makes colloids in alkali silicate unstable, and that such instability progresses with the dissolving of the additive to produce the gelation and also, finally, the hardening of the alkali silicate.

Examples of the present invention are as follows:

EXAMPLE 1

The following components were mixed:

| Material | Mixed Rate (parts by weight) |
| --- | --- |
| Molding Sand (silica sand) | 100 |
| Sodium Silicate (M.R.=2.3) | 7 |
| Manganese Carbonate (powder) | 2.1 |
| Surface-active Agent (sodium salt of N-lauryl amino propionic acid) | 0.2 |
| Water | 2.0 |

Molding sand (silica sand) and manganese carbonate are mixed in a mixer, the mixing being performed in a dried condition for about 1 to 2 minutes. To the surface-active agent previously mixed at a predetermined rate, water is added for mixing therewith for about 3 to 4 minutes. Furthermore, sodium silicate is added and mixed for about 1 to 2 minutes. In these steps, the mixed sand is fluidized so that it can be poured into a core box or a mold. The rate of fluidity of the mixed sand may be measured approximately by the flow cone method, in which a prescribed quantity of mixed sand is poured into a truncated cone and the cone suddenly removed therefrom in the vertical direction leaving the sand piled up. The rate of fluidity is indicated by a ratio of a height ($\Delta H$) of the spreading sand after the removal of the cone to the height (300 mm.) of the cone, namely the rate of fluidity = ($\Delta H$/300)×100 (%). In this method, the upper inside diameter of the truncated cone was 100 mm., while the lower inside diameter thereof was 200 mm. Furthermore, the rate of fluidity should not be below 65 percent, and, in the above-mentioned example, was 77 percent. The mixed sand thus obtained becomes harder and stronger as the setting time passes by. The compression strength of the mixed sand, which was poured into a core box of 50 mm. $\Phi \times$ 50 mm. H, was measured an hour after its molding and at proper time intervals thereafter. The results are shown below:

| After an hour: | 2.4 kg./cm.²; |
| --- | --- |
| After 3 hours: | 8.7 kg./cm.²; |
| After 5 hours: | 10.2 kg./cm.²; and |
| After 24 hours: | 12.8 kg./cm.². |

EXAMPLE 2

The following components were mixed:

| Material | Mixed Rate (parts by weight) |
| --- | --- |
| Molding Sand (silica sand) | 100 |
| Sodium Silicate (M.R.=2.3) | 7 |
| Manganese Carbonate (powder) | 1.4 |
| Surface-active Agent (sodium salt of N-lauryl amino propionic acid) | 0.3 |
| Water | 2.0 |

The rate of fluidity of the mixed sand having the above-mentioned compositions was 76 percent, and its compression strength as follows:

| After an hour: | 1.7 kg./cm.²; |
| --- | --- |
| After 3 hours: | 5.6 kg./cm.²; |
| After 5 hours: | 9.4 kg./cm.²; and |
| After 24 hours: | 11.0 kg./cm.². |

EXAMPLE 3

The following components were mixed:

| Material | Mixed Rate (parts by weight) |
| --- | --- |
| Molding Sand (silica sand) | 100 |
| Sodium Silicate (M.R.=2.3) | 7 |
| Manganese Carbonate (powder) | 1.05 |
| Surface-active Agent (sodium salt of N-lauryl amino propionic acid) | 0.3 |
| Water | 2.0 |

The rate of fluidity was 74 percent, and the compression strength was as follows:

| After an hour: | 1.4 kg./cm.²; |
| --- | --- |
| After 3 hours: | 3.7 kg./cm.²; |
| After 5 hours: | 5.1 kg./cm.²; |
| After 24 hours: | 9.2 kg./cm.². |

The mixing procedures in examples 2 and 3 are respectively, the same as in example 1. The mixed sand obtained in example 3 is capable of keeping its fluidity for about 10 minutes. The adjustment of the time is possible according to the kind of the surface-active agent used and also to the quantity added, according to the molecular ratio of the alkali silicate and the quantity added, and according to the quantity of the added self-hardener.

Furthermore, the rate of hardening of the core and that of the mold are likewise adjustable by the selection of the surface-active agent and the alkali silicate and by changing the quantity of the agent and the alkali silicate added, and also the quantity of the added self-hardener.

Apparently, the manganese carbonate used in the present invention is very good also as a self-hardener for a self-hardening molding material to which no surface-active agent is added. Such examples are shown below:

EXAMPLE 4

The following components were mixed:

| Material | Mixed Rate (parts by weight) |
| --- | --- |
| Molding Sand (silica sand) | 100 |
| Sodium Silicate (M.R.=2.3) | 7 |
| Manganese Carbonate (powder) | 3.5 |

The compression strength was as follows:

| After an hour: | 0.65 kg./cm.²; |
| --- | --- |
| After 3 hours: | 2.10 kg./cm.²; |
| After 5 hours: | 4.05 kg./cm.²; and |
| After 24 hours: | 18.8 kg./cm.². |

EXAMPLE 5

The following components were mixed:

| Material | Mixed Rate (parts by weight) |
| --- | --- |
| Molding Sand (silica sand) | 100 |
| Sodium Silicate (M.R.=2.3) | 7 |
| Manganese Carbonate (powder) | 1.5 |

The compression strength was as follows:

| After an hour: | 0.57 kg./cm.²; |
| --- | --- |
| After 3 hours: | 2.7 kg./cm.²; |
| After 5 hours: | 3.9 kg./cm.²; and |
| After 24 hours: | 17.6 kg./cm.². |

The rate of hardening and the compression strength of the self-hardening mold are adjustable as in the case of the fluid self-hardening mold; for such adjustment the molecular ratio and the quantity of added alkali silicate and the quantity of the added selfnhardener may be changed.

In the method of the present invention, the quantity of the added self-hardener is quite small, and therefore the reduction in refractoriness of the sand mold due to the addition does not occur; a metal penetration does not take place even when a steel having a high melting point is poured into the mold. The self-hardener of the present invention may contain a substance such as ore including manganese carbonate.

Furthermore, in the case of molds, (fluid self-hardening mold, self-hardening mold) which are naturally hardened, according to the present invention, by the use of manganese carbonate and also a substance (for instance ore) including manganese carbonate, these additives produce a carbon dioxide gas due to thermal reactions during pouring of molten metal. Owing to the gas produced, a reaction (sintering) between the alkali silicate and the molding sand is prevented. Accordingly, the above-mentioned molds are excellent in collapsibility as compared with the conventional molds subjected to carbon dioxide gas hardening.

What is claimed is:

1. In a composition for forming a mold or core without the use of carbon dioxide gas as the hardening agent comprising a mixture of molding sand, and alkali metal silicate in amounts of 6–10 percent by weight of the mixture, as a binder, the improvement comprising maintaining in said mixture powdered manganese carbonate in amounts of 0.5–5 percent by weight of said mixture, as a self-hardener for naturally hardening the mold and core.

2. A composition of material, as set forth in claim 1, wherein the mixture also includes a surface-active agent selected from the group consisting of a higher alcohol sulfonate ester, N-lauryl amino propionic acid and N-lauryl amino butyric acid in an amount of about 0.05–0.8 percent of the weight of the mixture.

3. A composition of material, as set forth in claim 2, wherein the mixture containing the surface-active agent includes water in an amount of approximately six to 10 times by weight of the mixture of the surface-active agent for further fluidizing the mixture.

4. A composition of material, as set forth in claim 1, wherein the mixture is comprised, on a parts per weight basis, of about 100 parts of molding sand, about seven parts of sodium silicate having a molecular ratio of 2.3, and about 1.5 to 3.5 parts of manganese carbonate.

5. A composition of material, as set forth in claim 1, wherein said molding sand is selected from at least one of the group consisting of silica sand, olivine sand, and zircon sand.

6. A composition of material, as set forth in claim 3, wherein the mixture is comprised, on a parts per weight basis, of about 100 parts of molding sand, about seven parts of sodium silicate having a molecular ratio of about 2.3, about 1.0 to 2.2 parts of manganese carbonate, about 0.2 to 0.3 parts of the surface-active agent of a sodium salt of N-lauryl amino propionic acid, and about two parts of water.

7. In a method of making a mold comprising the steps of mixing molding sand, an alkali metal silicate in amounts of 6–10 percent by weight of the mixture as binder and a hardening agent for effecting hardening of the mixture without the use of carbon dioxide gas, and forming the mixture into the desired mold shape, the improvement comprising adding to said mixture manganese carbonate in amounts of 0.5–5.0 percent by weight of the mixture as hardening agent.

8. A method, as set forth in claim 7, comprising the step of adding a surface-active agent to the mixture of molding sand alkali metal silicate and manganese carbonate to produce a fluidized sand wherein the surface-active agent is selected from the group consisting of a higher alcohol sulfonate ester, N-lauryl amino propionic acid and N-lauryl amino butyric acid in an amount of about 0.05–0.8 percent by weight of the mixture.

9. A method, as set forth in claim 8, comprising the step of adding water to the mixture of molding sand, alkali metal silicate and manganese carbonate and the surface-active agent for assisting in the production of fluidized sand wherein the water is six to 10 times by weight greater than the weight of the surface-active agent.

* * * * *